June 12, 1928.
R. P. F. LIDDELL
1,673,572
FILTER
Filed April 28, 1926    4 Sheets-Sheet 1
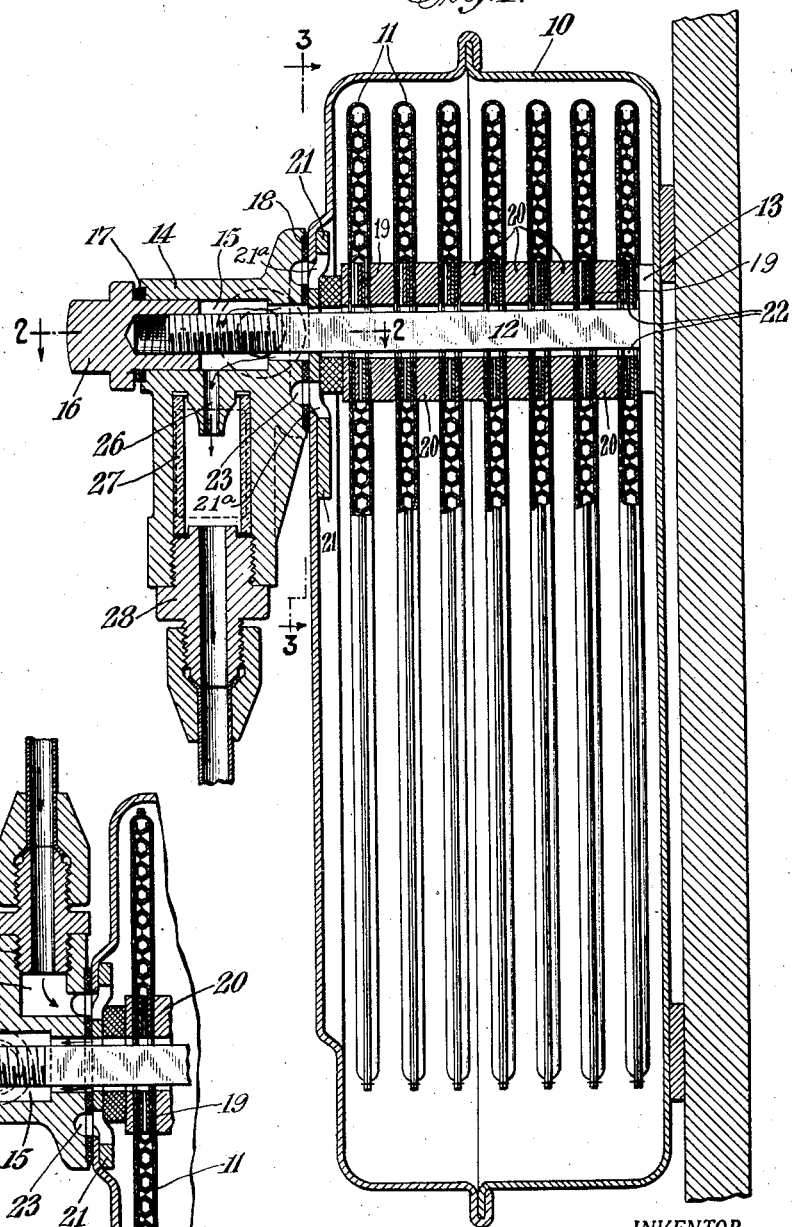
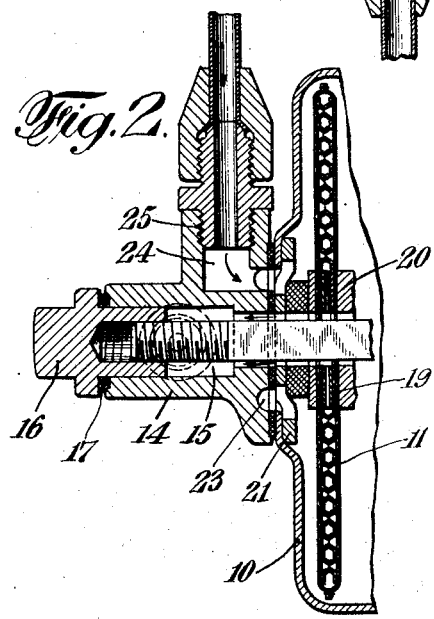
INVENTOR.
Robert P. F. Liddell
BY Kenyon & Kenyon
ATTORNEYS.

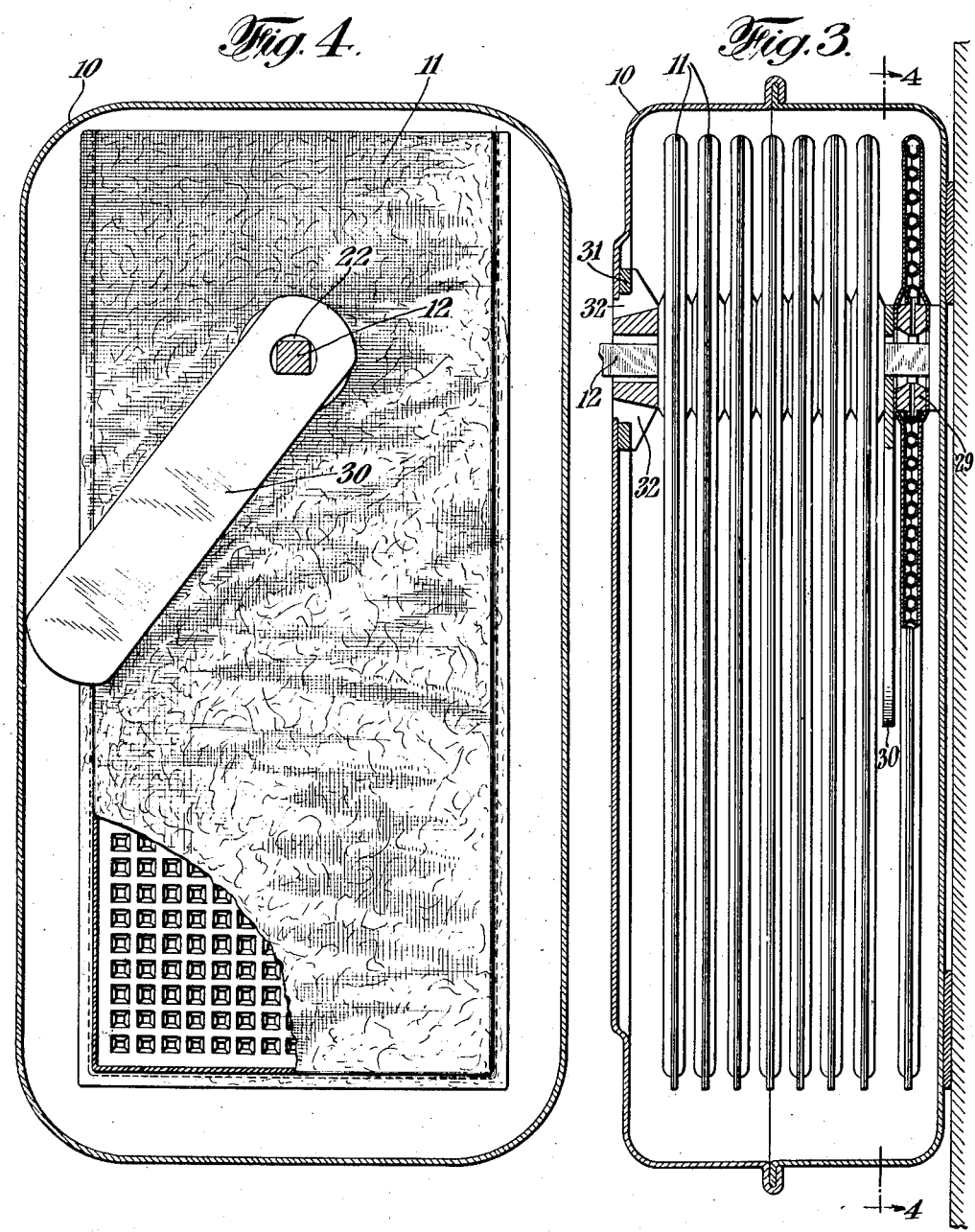

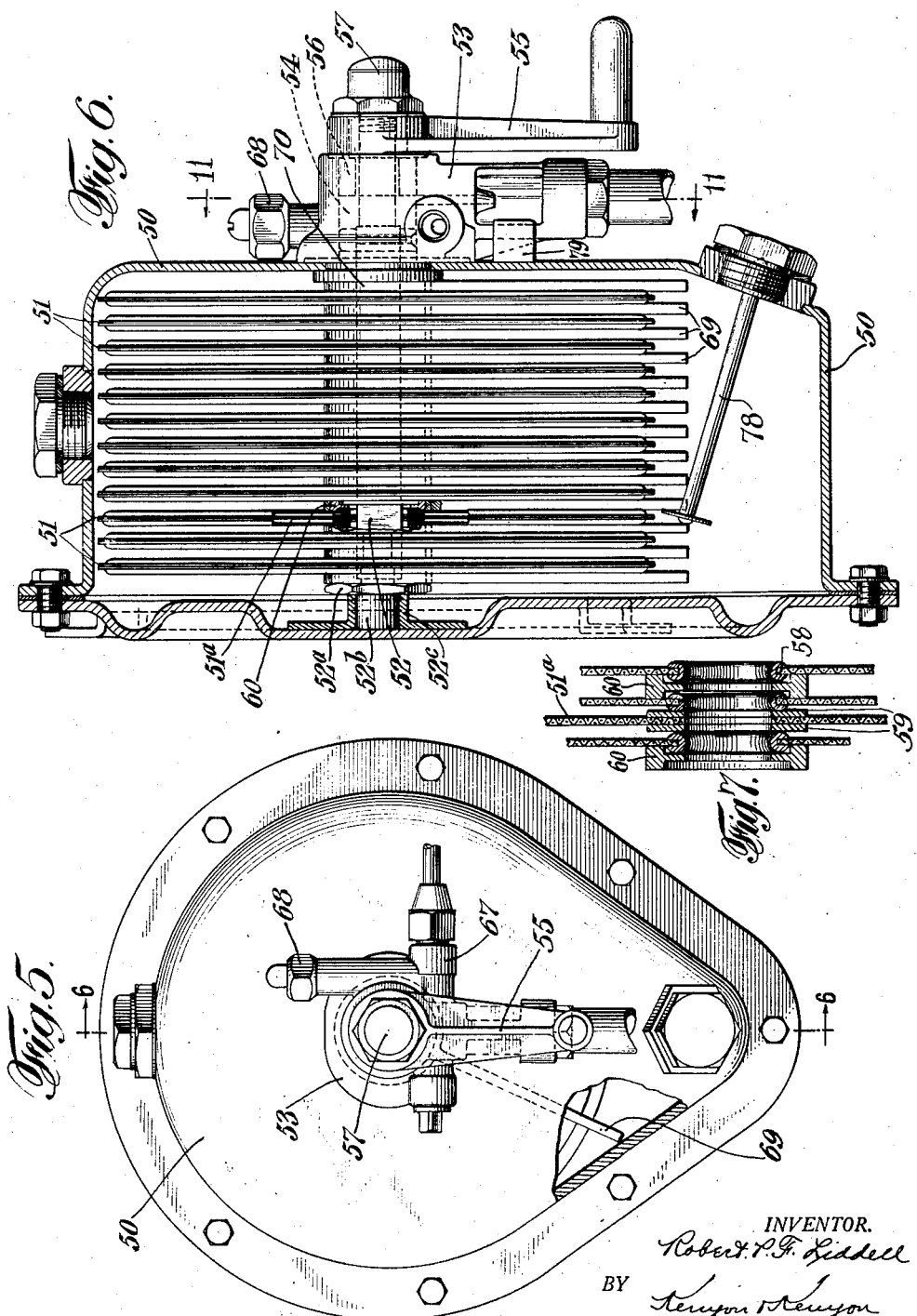

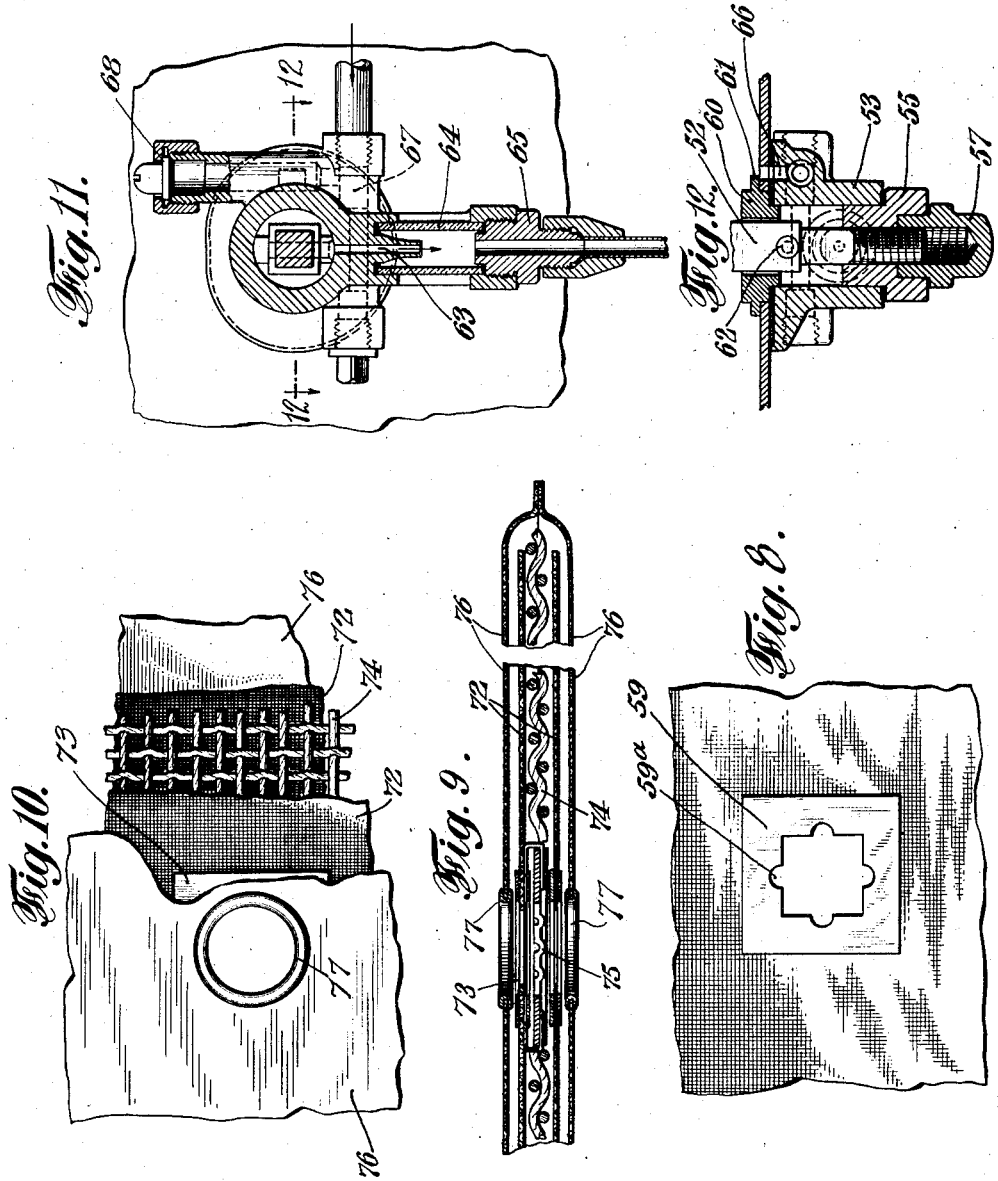

Patented June 12, 1928.

1,673,572

UNITED STATES PATENT OFFICE.

ROBERT P. F. LIDDELL, OF NEW YORK, N. Y., ASSIGNOR, BY MESNE ASSIGNMENTS, TO CENTRAL UNION TRUST COMPANY OF NEW YORK, TRUSTEE.

FILTER.

Application filed April 28, 1926. Serial No. 105,048.

This invention relates to filters and more particularly to filters for use in connection with the lubricating system of an internal combustion engine for removing deleterious matter from the lubricating oil.

An object of the invention is a compact and efficient filtering unit having a relatively large filtering surface in which the adjustment of a single member clamps to the filter casing and together a plurality of filtering members to form a unit having a channel communicating with the interior of each member and to attach to the filter casing a fitting having a passageway communicating with said channel for discharging filtered oil from the filter.

According to the invention, the filtering members are supported within the filter casing by a bolt passing through an aperture in each member and extending through the casing into a passageway within a fitting, the end of the bolt being threaded into a nut which closes the passageway in the fitting. Tightening the nut draws the head of the bolt toward the casing, thereby pressing the filtering members into a unit and clamping the unit against the casing and also clamping the fitting against the casing. The bolt is of different cross sectional configuration than the aperture through which it passes thereby forming an outlet for oil to flow from the interior of the filtering members along the bolt into the passageway in the fitting. In the fitting is also provided a passageway for leading oil to be filtered into the filter casing. The fitting is connected to the lubricating system of an internal combustion engine in such a manner that oil is supplied from the crank case of the engine under pressure to the inlet channel and the filtered oil discharged through the fitting is led back to the crank case either directly or by way of the bearings.

In a modified form, means are provided for removing from the filter members any dirt that may have collected thereon. In this modification the supporting bolt and the filtering unit are rotatably mounted in the casing and to the end of the bolt extending into the fitting is attached a handle for rotating it. Cleaning fingers project on either side of the filtering members so that when they are rotated any dirt or other material accumulated thereon is scraped off.

Other objects, novel features and advantages of the invention will be apparent from the following specification and accompanying drawings, in which Figure 1 is a vertical section of one type of filter embodying the invention.

Figure 2 is a fragmentary section on the line 2—2 of Fig. 1.

Figure 3 is a fragmentary view similar to Fig. 1 of a modified form.

Figure 4 is a section on the line 4—4 of Fig. 3.

Figure 5 is a front elevation of a filter in which the filter members are rotatable.

Figure 6 is a section on the line 6—6 of Fig. 5 with the filter members shown in elevation.

Figure 7 is an enlarged partial section of a filtering member and spacers.

Figure 8 is a face view of the portion shown in Fig. 7.

Figure 9 is a section partially broken away through a modified form of filter member.

Figure 10 is a face view partially broken away of Fig. 9.

Figure 11 is a section on the line 11—11 of Fig. 6; and

Figure 12 is a section on the line 12—12 of Fig. 11.

Referring now to Figs. 1–4 inclusive, 10 designates a filter casing which may consist of two sections having opposing edges, one of which is bent over the other to form a liquid tight connection although other types of liquid tight connection may be used. Within the casing is provided a filtering unit comprising a plurality of filtering members 11 which are supported by a square bolt 12 having a head 13. The end of the bolt 12 is threaded and extends through an aperture in the front wall of the casing 10. A fitting 14 closes the aperture in the casing and is provided with a passageway 15 into which extends the threaded end of the bolt 12. The passageway 15 is closed by a nut 16 having a cylindrical portion extending into the passageway, the cylindrical portion being interiorly threaded to receive the end of the bolt 12. A gasket 17 is provided between the nut 16 and the fitting 14 and another gasket 18 is provided between the fitting 14 and the filter casing.

Each filtering member 11 comprises a sheet of metal folded to present parallel faces provided with alined circular apertures through which the bolt 12 passes, the diameter of which is approximately equal to the diagonal of the bolt 12. Except just adjacent the alined apertures the plates are punched to provide perforations and the metal punched out from the plates forms projections to space the faces. Interposed between the faces and in alinement with the apertures therethrough are provided a pair of washers 19 having offset portions through which oil may pass. Each filtering member is enclosed in a bag of filtering cloth preferably canton flannel or other fine mesh material, the nap side of the cloth being on the outside of the bag. Holes are provided in the filter cloth through which the bolt 12 passes. Adjacent filtering units are spaced apart by annular members 20 between each of which and the metal portion of the filtering unit is clamped a portion of the filter bag, thereby forming a gasket. The aperture in the front of the casing through which the bolt 12 passes is of considerably larger diameter than the bolt and a face member 21 extends across it, this member being attached to the casing in such a way as to prevent rotation thereof. In this member is provided an aperture through which the bolt 12 passes. This aperture, however, instead of being completely circular has a flat portion engaging one face of the bolt to prevent rotation thereof. Suitable spacing members are interposed between the member 21 and the filtering unit 11 adjacent thereto. Because of the fact that the bolt 12 is square and the apertures through which it passes are circular with the exception of the aperture in the member 21, there are provided a plurality of channels 22 by means of which oil may flow from the filtering members into the passageway 15 in the fitting 14.

In the face of the fitting 14 abutting the casing there is provided an annular channel 23 which communicates through apertures 21ª in the member 21 with the interior of the casing. A channel 24 extends from the annular channel 23 through the fitting and terminates in a threaded socket 25. A port 26 leads from the passageway 15 through a sight glass 27 which is held in proper position by a coupling 28 to which a discharge pipe may be attached. Oil to be filtered is fed into the filter through the channels 24 and 23, percolates through the filter bags and flows between the faces of the filtering members through the offset portions in the washers 19 into the passageways along the bolt 12 through which it is discharged into the passageway 15 and from there it flows through the port 26 and the sight glass 27 to the outlet pipe.

Tightening the nut 16 on the bolt 12 presses together the filtering members and the spacers 20 between the head 13 and the wall of the casing and also draws the fitting against the casing. The gaskets 17 and 18 are compressed to form fluid tight connection and the portions of the filter bags lying between the spacers 20 and the metal plates act as gaskets to prevent flow of oil into the outlet passageway.

In the modification disclosed in Figs. 3 and 4, each filtering member is provided with an annular member 29 having a central portion of larger diameter which extends a short distance between the faces of the filtering member. In each of the members 29 are provided a plurality of ports through which oil may flow from the filtering member. The filtering members are maintained in spaced relation by contact of the projecting portions of the members 29 between the adjacent faces of which are gripped portions of the filtering bags to act as gaskets. Between two of the filtering members is interposed an arm 30 having an aperture through which bolt 12 passes. This aperture instead of being circular, as are the other apertures, has a flat portion to engage one face of the bolt. This arm effectively prevents the bolt from turning when the nut is being tightened thereon by contact with the side wall of the casing. Interposed between the casing and the filtering member is a collar 31 which spaces the filtering unit from the casing and is also provided with inlet ports 32 arranged to register with the channel 23 in the fitting 14 when the latter is in position.

Referring now to Figs. 5–12 inclusive, 50 represents a filter casing of any suitable design, preferably one having a pocket in which dirt or other material filtered from the oil may be collected. Within the filtering casing is provided a plurality of circular filtering members 51. These filtering members are supported by a bolt 52 which extends through apertures in the filtering members and which is provided with a threaded end extending through an aperture in the wall in the filter casing. The bolt has threaded in its end a stud 52ª having a hexagonal head and a projection 52ᵇ which fits in a socket formed by the member 52ᶜ attached to the rear wall of the casing. A fitting 53 closes the aperture in the casing and is provided with a passageway 54 through which projects the end of the bolt 52. The bolt 52 is square and the apertures in the filter members 51 through which it passes are also square. A handle 55 closes the passageway 54 and has a collar 56 extending into the passageway, there being a square aperture in the collar to receive the bolt. A nut 57 is threaded on to the end of the bolt to hold the handle 55 in place.

Each filter member 51 comprises a disk 51ª of wire mesh covered with a bag of filtering material through which are provided apertures. Grommets 58 bind the edges of the apertures in the filter bags and the diameter thereof is approximately equal to the diagonal of the bolt. In the center of each disk is provided a pair of plates 59 having square openings, the plates being welded together and to the screen at their corners. A plurality of spacers 60 are provided on the bolt 52 between adjacent filtering members and also at the outside of each end member. These spacers have internal diameters substantially equal to the diagonal of the bolt and are recessed to receive the grommets 58. The spacer 60 arranged between the front wall of the casing and the filtering member next adjacent thereto is provided with an enlarged portion 61 which bears against the casing, a portion fitting in the aperture and a portion projecting into the passageway 54 in the fitting 53. A pin 62 extends through the bolt and is normally arranged within the passageway 54. This pin, when the filter members are being assembled on the bolt, serves to prevent them from slipping off the threaded end. The inner edges of the plates 59 are cut out at 59ª to provide semi-circular passageways through which oil may flow along the flat faces of the bolt to the passageway 54. From the passageway 54 is provided an outlet port 63 leading through a sight glass 64 which is held in place by a coupling 65 through the medium of which a discharge pipe may be connected to the fitting. Gaskets are interposed between the fitting and the filter casing and also between the handle 55 and the fitting.

An inlet channel 66 communicates with the interior of the filter through an aperture in the filter casing and communicates with a cross bore 67 having a threaded socket at each end to either of which may be attached a supply line, the other end being closed by a plug. A cap 68 may close the other end of channel 66 or if desired a pressure gauge may be attached thereto. Cleaning fingers 69 are arranged at either side of each filtering member 51 and are supported by loops 70 encircling the spacer 60. These fingers are freely mounted upon the spacers but their movement is limited by engagement with the wall of the casisng.

The filtering members 51, the spacers 60 and the member 61 are assembled on the bolt 52 and the stud 52ª threaded into the end of the bolt after which the threaded end of the bolt is passed through the aperture of the casing into the passageway 56 in the fitting where it receives the handle 55 and the nut 57 is threaded on the end of the bolt. Tightening the nut 57 draws the head 52ª toward the annular member 61 to complete the assembling of the filtering unit and also draws the fitting 53 against the casing and the handle 55 into contact with the fitting to close the passageway 54. The plates 59 prevent the filter cloth being forced into the interstices of the wire disk thereby permitting oil to trickle along the disk into the passageways extending along the bolt. Gaskets between the handle and the fitting and between the fitting and the casing provide oil tight connections and the portions of the filter bags lying between the plates 59 and the spacer 60 also act as gaskets to provide liquid tight joints.

In a modified form of the filtering member, as shown in Figs. 9 and 10, two wire screen disks 72 are provided, each of the disks being provided with plates 73. Between the disks 72 is arranged a separator 74 comprising a disk of suitable material such for example as heavy wire mesh, coconut fiber, jute or the like. In the center of the separator is arranged a washer 75 having radiating corrugations. The washer 75 is attached to one of the disks by means of ears provided on one of the plates 73 and bent over the edge of the washer 75. A bag 76 of filtering cloth encloses the two screens and the separator and is provided with apertures registering with the apertures in the screens, the edges of the apertures being bound with the grommets 77.

To clean the dirt from the filtering members, the handle 55 is operated to rotate the filter unit, thereby causing the surfaces of the filtering members to be scraped by the fingers 70 which are held stationary by engagement with the casing 71. Any dirt which may collect on the filter bags is scraped off and dropped into the pocket of the casing from which it may be removed through an aperture by means of a scraper 78. The fitting 53 is held against rotation when the handle is turned by a clip 79 arranged on the exterior of the filter casing.

It is, of course, understood that various structural modifications may be made in the device above disclosed without in any way departing from the spirit of the invention as set forth in the appended claims.

What I claim as new and desire to secure by Letters Patent of the United States is:

1. A filter comprising a casing having an aperture, a filter unit having a discharge port, a fitting having an outlet channel, supporting means and means cooperating with said supporting means for clamping said filtering unit and said fitting to said casing with said discharge port and outlet channel in register with the aperture in said casing.

2. A filter comprising a casing having an opening, a plurality of filtering members having apertures therethrough, a fitting having an outlet channel, supporting means and means cooperating with said supporting means for clamping said members together to form a unit and said unit and fitting to the filter casing with the apertures and channel in alignment with said opening.

3. A filter comprising a casing having an aperture, a fitting having a passageway, a filtering unit having a channel therethrough, a supporting member extending through said channel, aperture and passageway, and means on said member for clamping said filtering unit and fitting to said casing.

4. A filter comprising a casing having an aperture, a fitting having a passageway therethrough, a filtering unit having a channel therethrough, a bolt having its head in contact with said filtering unit and extending through said channel, aperture and passageway, and a nut on said bolt whereby tightening of the nut clamps said filtering unit and said fitting to said casing.

5. A filter comprising a casing having an aperture, a fitting having a passageway, a filtering unit composed of a plurality of filtering members having channels therethrough, a member extending through said channels, aperture and passageway, and means on said member for clamping said filtering members together into a unit and clamping said unit and fitting to said casing with said channels, aperture and passageway in alignment.

6. A filter comprising a casing having an aperture, a fitting having a passageway therethrough, a filtering unit within said casing composed of a plurality of filtering members having apertures therethrough, a bolt passing through said channels, aperture and passageway, and a nut on said bolt whereby it clamps said filtering members together to form a unit and clamping said unit and fitting to said casing.

7. A filter comprising a casing having an aperture, a fitting having a passageway extending therethrough, a filtering unit having a channel therethrough, a bolt having its head in contact with one face of the filtering unit and extending through said channel, aperture and passageway, and a nut on said bolt for clamping said filtering unit and fitting to said casing, said bolt being of less cross sectional area than said channel, aperture and passageway.

8. A filter comprising a casing having an aperture, a fitting having a passageway therethrough, a filtering unit within said casing having a tubular channel extending therethrough and communicating with the interior of the filtering unit, a square bolt extending through said channel, aperture and passageway, and a nut on the end of said bolt for clamping said filtering unit and said fitting to said casing.

9. A filter comprising a casing having an aperture, a fitting having a passageway therethrough, a filtering unit within said casing having a tubular channel extending therethrough and communicating with the interior of said filtering unit, a bolt extending through said channel, aperture and passageway, and a nut on the end of said bolt for clamping said filtering unit and said fitting to said casing, the said bolt being of different configuration than said channel, aperture and passageway.

10. In a filter, a plurality of filtering members, each filtering member comprising a pair of parallel plates having aligned apertures, a bag of filtering material enclosing each filtering member, said bag having apertures in alignment with the apertures in said parallel plates, a tubular element having radial ports arranged between said plates and having projections extending through said apertures, and means for clamping said members together with the tubular elements in alignment, portions of the filtering bags being interposed between the abutting ends of said projections.

11. In a filter, a filtering unit comprising a plurality of filtering members, each filtering member comprising a pair of plates having alinged apertures, a tubular member having radial ports arranged between said plates and having projections extending through said apertures, a bag of filtering material enveloping said plates and having apertures registering with said tubular member, and means comprising a bolt and a nut therefor to clamp said tubular members together with portions of the bags interposed between their adjacent ends.

12. A filter comprising a casing having an opening, a fitting having a passageway, a plurality of filtering members having apertures, a bolt passing through said apertures, opening and passageway, means for spacing said filtering members, a nut for said bolt for clamping said filtering members and fitting to said casing in alignment with said aperture, said bolt being of smaller cross sectional area than said apertures, opening and passageway.

13. A filter comprising a casing having an aperture, a fitting having a passageway therethrough, a filtering unit having a channel therethrough, a bolt having its head in contact with said filtering unit and extending through said channel, aperture and passageway, a nut on said bolt for clamping said filtering unit and said fitting to said casing and means to prevent rotation of said bolt.

14. A filter comprising a casing having an aperture, a fitting having a passageway therethrough, a filtering unit within said casing composed of a plurality of filtering members having apertures therethrough, a bolt passing through said channels, aperture and passageway, a nut on said bolt for clamping said filtering members together to form a unit and clamping said unit and fitting to said casing and means to prevent rotation of said bolt.

15. A filter comprising a casing having an aperture, a fitting having a passageway therethrough, a filtering unit within said casing having a tubular channel extending therethrough and communicating with the interior of the filtering unit, a square bolt extending through said channel, aperture and passageway, a nut on the end of said bolt for clamping said unit and said fitting to said casing and an arm on said bolt for preventing rotation thereof.

16. A filter comprising a casing having an opening, a plurality of filtering members having apertures therethrough, a fitting having a passageway, a supporting member for said filtering members extending through the apertures in the opening and into said passageway and an adjustable member cooperating with said supporting member to clamp said filtering members together to form a unit and to clamp said unit and fitting to said casing.

17. A filter comprising a casing having an opening, a fitting having a passageway therethrough, a filtering unit in said casing, a bolt extending through said unit opening and passageway, and means cooperating with said bolt for clamping said filtering unit and fitting to said casing.

18. A filter comprising a casing having an aperture, a fitting having a passageway therethrough, a filtering unit within said casing composed of a plurality of filtering members, each filtering member comprising a pair of plates having aligned apertures, a tubular member having radial ports arranged between said plates and having projections extending through said apertures, a bolt passing through said tubular members, aperture, and fitting and a nut thereon to clamp said members together to form a filtering unit and to clamp said unit and fitting to said casing, said bolt being of smaller cross-section than the interior of said tubular members, aperture, and passageway.

19. A filter comprising a casing having an aperture, a fitting having a passageway therethrough, a filtering unit within said casing composed of a plurality of filtering members, each filtering member comprising a pair of plates having aligned apertures, a tubular member having radial ports arranged between said plates and having projections extending through said apertures, a bag of filtering material enveloping each pair of plates and having apertures registering with said tubular member, a bolt passing through said tubular members, aperture, and passageway and a nut thereon to clamp said members together to form a filtering unit with portions of the bags interposed between their adjacent ends and to clamp said unit and fitting to said casing, said bolt being of smaller cross-section than the interior of said tubular member.

20. In a filter, a casing having an aperture, a fitting having a passageway, a plurality of filtering members, each filtering member having a channel extending therethrough and communicating with the interior thereof, supporting means, and means cooperating with said supporting means for clamping said filtering members together to form a unit and clamping said unit and fitting to the filter casing with the channels and passageway in alignment with said aperture.

21. In a filter, a casing having an aperture, a fitting having a passageway, a plurality of filtering members, each filtering member having a channel extending therethrough and communicating with the interior thereof, a supporting member extending through said channels, apertures and passageway, and means cooperating with said supporting member to clamp together said filtering members to form a unit and clamping said unit and fitting to the filter casing, said supporting member being of different configuration than said passageway, aperture and channels.

In testimony whereof, I have signed my name to this specification.

ROBERT P. F. LIDDELL.